(12) United States Patent
Yee et al.

(10) Patent No.: US 7,835,314 B2
(45) Date of Patent: *Nov. 16, 2010

(54) PHYSICAL LAYER INTERFACE SYSTEM AND METHOD FOR A WIRELESS COMMUNICATION SYSTEM

(75) Inventors: Jung Yee, Kanata (CA); Jeff Foerster, Portland, OR (US)

(73) Assignee: Alcatel-Lucent Canada Inc., Kanata, ON (CA)

( * ) Notice: Subject to any disclaimer, the term of this patent is extended or adjusted under 35 U.S.C. 154(b) by 456 days.

This patent is subject to a terminal disclaimer.

(21) Appl. No.: 11/690,570

(22) Filed: Mar. 23, 2007

(65) Prior Publication Data

US 2007/0165578 A1 Jul. 19, 2007

Related U.S. Application Data

(63) Continuation of application No. 09/725,637, filed on Nov. 29, 2000, now Pat. No. 7,209,455.

(51) Int. Cl.
H04W 28/06 (2009.01)
(52) U.S. Cl. .................................................. 370/310.1
(58) Field of Classification Search ................ 370/310.1
See application file for complete search history.

(56) References Cited

U.S. PATENT DOCUMENTS

| 5,751,702 A | 5/1998 | Evans et al. |
| 6,151,312 A | 11/2000 | Evans et al. |
| 6,282,187 B1 | 8/2001 | Evans et al. |

FOREIGN PATENT DOCUMENTS

| GB | 2319709 A | 5/1998 |
| WO | WO 97/29559 | 8/1997 |
| WO | WO 97/48191 | 12/1997 |
| WO | WO 98/35463 | 8/1998 |

OTHER PUBLICATIONS

Koga et al., 'Radio Link Configurations of Broadband Wireless Access System', Personal Wireless Communication, Feb. 1999, pp. 354-358.*
"Draft Physical Layer Specification for the 802.16.1 Air Interface Standard", Jeff Foerster, Jul. 13, 2000, IEEE 802.16 Broadband Wireless Access Working Group, http://ieee802.org/16, pp. 1-1 to 11-79.
"Design and Performance of ATM Wireless Access Prototype", Matsue et al., NTT Wireless Systems Laboratories, Japan, pp. 853-859, 1998.

* cited by examiner

*Primary Examiner*—Melvin Marcelo
(74) *Attorney, Agent, or Firm*—Marks & Clerk

(57) ABSTRACT

Physical layer interface system for use in a broadband wireless access communication network is provided. The broadband wireless access communication network comprises a base station, a subscriber station and a wireless communication link for transmitting wireless communication signals upstream and downstream between the base station and the subscriber station. The physical interface system comprises a first physical layer interface for the base station for processing the communication signals upstream and downstream between the subscriber station and the base station and a second physical layer interface for processing communication signals upstream and downstream between the subscriber station and the base station. The first physical layer interface transmits downstream transmission of communication signals from the base station to the subscriber station in a burst mode.

20 Claims, 11 Drawing Sheets

P=1 byte pointer field, not present in all packets

| Header (PUSI=1) | P =0 | MAC frame (up to 183 bytes) | stuff_byte (0 or more) |

P=1 byte pointer field

| Header (PUSI=1) | P =M | Tail of MAC frame #1 (M bytes) | stuff_byte (0 or more) | Start of MAC Frame 2 |

P=1 byte pointer field

| Header (PUSI=1) | P =0 | MAC Frame 1 | MAC Frame 2 | stuff_byte (0 or more) | Start of MAC Frame 3 |

P=1 byte pointer field

| Header (PUSI=1) | P =0 | stuff_byte (0 or more) | Start of MAC Frame 1 (up to 183 bytes) |
| Header (PUSI=0) | P =0 | Continuation of MAC frame 1 (184 bytes) | |
| Header (PUSI=1) | P =M | Tail of MAC frame 1 (M bytes) | stuff_byte (0 or more) | Start of MAC Frame 2 |

324e    P=1 byte pointer field

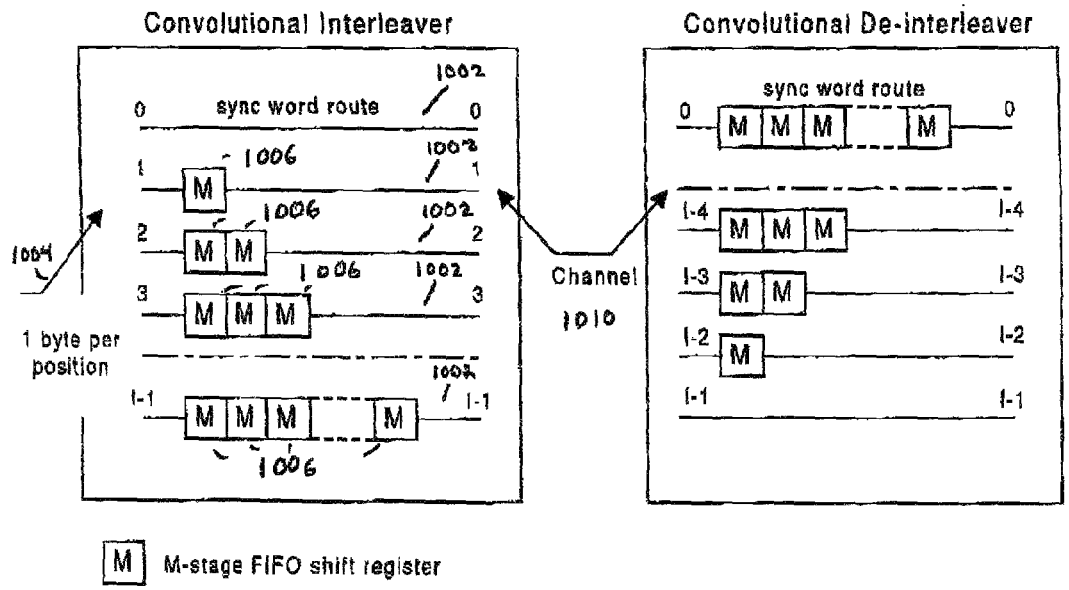
*Conceptual diagram of the convolutional interleaver and de-interleaver.*
Figure 10a
Fig 10b
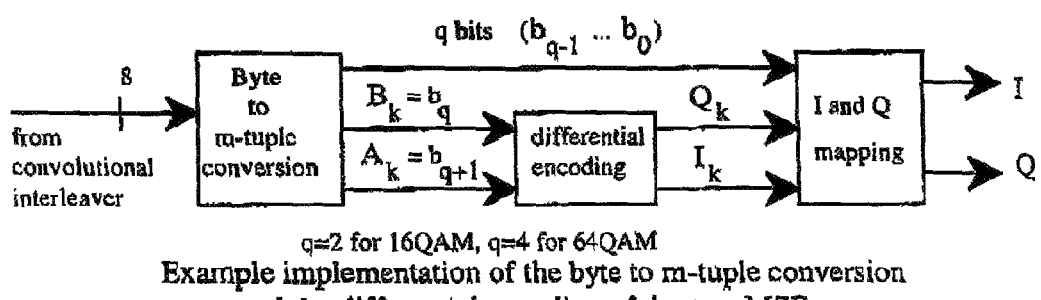
q=2 for 16QAM, q=4 for 64QAM
Example implementation of the byte to m-tuple conversion
and the differential encoding of the two MSBs.

*Upstream Data Flow*

Differentially encoded 16 QA Constellation diagram

PHYSICAL LAYER INTERFACE SYSTEM AND METHOD FOR A WIRELESS COMMUNICATION SYSTEM

CROSS REFERENCE TO RELATED APPLICATION

This application is a continuation under 35 USC 120 of U.S. patent application Ser. No. 09/725,637, filed Nov. 29, 2000 now U.S. Pat. No. 7,209,455.

FIELD OF INVENTION

The field of the invention relates to data transmission system and methods, in particular wireless data transmission systems and protocols.

BACKGROUND TO THE INVENTION

A broadband wireless access (BWA) system provides a point-to-multipoint communication system in a communications network. BWA systems use microwave and millimeter wave technology to transmit communication signals from a wireless base station to a subscriber station located at a fixed site. A BWA system can transmit various types of digital signals including video, voice, television, Internet and other data signals. A BWA system provides easy deployment, minimal environmental impact, and lower infrastructure and real estate requirements. BWA systems are currently being licensed worldwide and in the frequency range from 20 GHz to 42 GHz, The United States government recently completed Local Multi-Point Distribution Service (LMDS) auctions providing 1.3 GHz of bandwidth in the 28 to 31 Hz range nation-wide for BWA systems. A BWA system is similar to a cellular communication network: both use wireless cells to cover geographic areas, typically from 2 to 5 kilometers in radius. However, whereas in a cellular communication network, a subscriber is mobile and changes location from cell to cell, the subscriber station in a BWA system is located at a fixed site. The transceiver of a BWA subscriber station is at a fixed location and is associated with a particular cell at all times, Also the operating frequency range used by a BWA system is typically much higher than the range used in a cellular communication network.

An important feature of a BWA system is that it bypasses the local loop to the subscriber. A BWA system provides data communications to a subscriber's site over the air without physical cabling to the premises.

Most BWA systems send and receive data using Asynchronous Transfer Mode (ATM), many high quality services can be run concurrently. Thus BWA systems are highly versatile and cost effective for both providers and subscribers of broadband services. In addition to offering traditional services BWA systems can also extend to reach of advanced services such as virtual private networks, encryption, teleconferencing, and voice over IP, distance learning, and telemedicine.

Another feature of a BWA system is that it can be installed quickly. A new BWA system can establish services to a market without existing network infrastructure, such as copper wires or optical fibre, and can rapidly establish a communication network, A BWA system also allows existing providers to complement or expand their existing network to increase or augment their coverage areas.

Another feature of a BWA system is the mobility of its equipment, Unlike a copper wire or optical fibre infrastructure, BWA equipment can be disconnected and transported to another geographic site as required. This is particularly desirable in an industry where there is a high turnover, or churn, rate in customers.

A BWA system has three essential elements: a base station, customer premise equipment and a network management system. A base station is a central location that collects all traffic to and from subscribers within the cell. The base station includes an interface to the wireline or wireless backbone, which is the link between a subscriber and a backbone network. It also consists of a transmitter and receiver, which collects the traffic to and from subscribers within cell.

At a subscriber site, the equipment is similar to equipment at the base station, except that the transmitter, receiver, and antenna are generally housed in a compact unit that is highly directional. The subscribers premise equipment also includes network interface units, which enable a range of communications protocols, such as T1, TOS, the Internet and digital video.

The network management system controls network components and the services being delivered. Ideally the network management system will also provide end-to-end functionality throughout both the wireless and wireline elements of the network.

For signal transmission direction convention, wireless communication signals sent from a base station to subscriber station are sent in a "downstream" direction and wireless communication signals sent from subscriber station to base station are sent in an "upstream" direction.

Communication systems are often modelled in layers. Each layer provides a specific task for the communication systems. Each layer interfaces with its lower and higher layers through standardized protocols. See for example, the OSI layer topology.

The three above elements of a BWA system may be grouped into a physical layer. The services to be provided, such as T1, TOS, Internet, and digital video, may be grouped into an application layer. For effective operation of a communication system, an interface layer is required to properly mesh the services offered by elements in the application layer to the physical equipment in the physical layer. The interface layer may also be modelled as different layers, with interfaces connecting each layer to another layer.

It is desirable to provide a physical layer interface for a wireless communications system that has robustness of implementation and reduced implementation costs.

SUMMARY OF THE INVENTION

In one aspect, the invention provides a physical layer interface system for use in a broadband wireless access communication network. The broadband wireless access communication network comprises a base station, a subscriber station and a wireless communication link for transmitting wireless communication signals upstream and downstream between the base station and the subscriber station. The physical interface system comprises a first physical layer interface for the base station for processing the communication signals upstream and downstream between the subscriber station and the base station and a second physical layer interface for the subscriber station for processing the communication signals upstream and downstream between the subscriber station and the base station. In particular, the second physical layer interface transmits downstream transmission of communication signals from the subscriber station to the base station in a burst mode.

The physical layer interface system may have the first physical layer interface transmitting the downstream transmission of communication signals using one transmission frequency for a carrier.

The physical layer interface system may have the first physical layer interface for the downstream transmission communication signals further comprising a synchronization control unit, a frequency control unit and a power control unit.

The physical layer interface system may have the interface physical layer system utilizing frequency division multiplexing providing carriers on separate frequencies for upstream and downstream communications.

The physical layer interface system utilize time division multiple access transmission protocol for the upstream transmission of communication signals.

The physical layer interface system may have the upstream physical layer utilizing demand assigned multiple access communication protocol for the downstream transmission of communication signals.

The physical layer interface system may have the first physical layer interface layer further comprising an interfacing unit, an inversion and randomization unit, an encoding unit, a convolution interleaving unit, a convolution code puncturing and mapping unit, a baseband pulse shaping unit and a downstream modulator and physical interface. In particular, the interfacing unit, the inversion and randomization unit, he encoding unit, the convolution interleaving unit, the convolution code puncturing and mapping unit, the baseband pulse shaping unit and the downstream modulator and physical interface may operate together to produce the downstream transmission from an encoded transmission produced by the base station. Further, the inversion and randomization unit may comprise a synchronization byte inversion unit for a synchronization byte associated with the encoded transmission and a transport stream packet randomizer, the synchronization byte further comprising a sync byte and a field for frame synchronization. Still further, the inversion and randomization unit may insert a value for the field for frame synchronization.

The physical layer interface system may have convolution code puncturing and mapping unit utilizing one modulation technique selected from quadrature phase shift keying modulation, Trellis coded modulation, phase shift keying modulation, quadrature amplitude modulation or differential-encoding.

The physical layer interface system may have the second physical layer comprising a randomization unit, a second encoding unit, a preamble prepender, a symbol mapping unit, a second baseband pulse shaping unit and a second modulator and physical interface unit.

In a second aspect, the invention provides a physical layer interface system for use in a broadband wireless access communication network. The broadband wireless access communication network comprises a base station, a subscriber station and a wireless communication link for transmitting wireless communication signals upstream and downstream between the base station and the subscriber station. The physical interface system comprises a physical layer interface for the base station for processing the communication signals upstream and downstream between the subscriber station and the base station. In particular, the physical layer interface transmits upstream transmission of communication signals to the base station in a burst mode. Further, the physical layer may comprise an interfacing unit, an inversion and randomization unit, an encoding unit, a convolution interleaving unit, a convolution code puncturing and mapping unit, a baseband pulse shaping unit and a downstream modulator and physical interface. In particular, the interfacing unit, the inversion and randomization unit, the encoding unit, the convolution interleaving unit, the convolution code puncturing and mapping unit, the baseband pulse shaping unit and the downstream modulator and physical interface may operate together to produce the downstream transmission from an encoded transmission produced by the base station.

In a third aspect, the invention provides a physical layer interface system for use in a broadband wireless access communication network. The broadband wireless access communication network comprises a base station, a subscriber station and a wireless communication link for transmitting wireless communication signals upstream and downstream between the base station and the subscriber station. The physical interface system comprises a physical layer interface for the subscriber station for processing the communication signals upstream and downstream between the subscriber station and the base station. In particular, the physical layer interface receives upstream transmission of communication signals from the subscriber station transmitted in a burst mode.

The physical layer may comprise a randomization unit, an encoding units, a preamble prepender, a symbol mapping units; a baseband pulse shaping units; and a modulator and physical interface unit.

In a fourth aspect, the invention provides a method of transmitting data packets encoded in a data transmission stream for use in a broadband wireless access communication network. The broadband wireless access communication network comprises a base station, a subscriber station and a wireless communication link for transmitting wireless communication signals upstream and downstream between the base station and the subscriber station. The physical interface system comprises a first physical layer interface for the base station for processing the communication signals upstream and downstream between the subscriber station and the base station and a second physical layer interface for the subscriber station for processing the communication signals upstream and downstream between the subscriber station and the base station. The method of transmitting data packets comprises transmitting the data packets in a burst mode from the second physical layer to the first physical layer.

The method of transmitting data packets encoded in a data transmission stream may, prior to the transmitting the data packets, generate a data stream related to the data packets. The data stream may be generated by inserting a sync byte into the data transmission stream into a second data stream, randomizing the second data stream, encoding the second data stream with Reed-Solomon codes into an encoded data stream and interleaving the encoded data stream utilizing convolutional coding.

The method of transmitting data packets encoded in a data transmission stream may randomize the second data stream by utilizing spectral shaping and shifting with a linear feed back register.

The method of transmitting data packets encoded in a data transmission stream may transmit the data packets by also utilizing pulse shaping of the encoded signals with filters producing filtered signals and modulating the filtered signals utilizing one of a quadrature phase shift key, a Trellis code, a phase shift key, quadrature amplitude or differential code. Furthers the method may transmit the data packets either by utilizing a time division multiple access or a demand assigned multiple access communication protocol. Alternatively the method may generate the data stream by randomizing it, encoding a Reed-Solomon code it producing an encoded data stream and prepending a preamble to the encoded data stream. Further, the method may map the encoded data stream into data signals and modulate the data signal utilizing one of quadrature phase shift keying or quadrature amplitude modulation.

In other aspects the invention provides various combinations and subsets of the aspects described above.

BRIEF DESCRIPTION OF THE DRAWINGS

A detailed description of the embodiments is provided herein below with reference to the following drawings, in which:

FIG. 3c is; still another block diagram of an MPEG packet, which may be transmitted via the layer architecture of FIG. 2;

FIG. 3d is still another block diagram of an MPEG packet, which may be transmitted via the layer architecture of FIG. 2;

FIG. 3e is still another block diagram of an MPEG packet, which may be transmitted via the layer architecture of FIG. 2;

FIG. 3f is still another block diagram of an MPEG packet, which may be transmitted via the layer architecture of FIG. 2;

FIG. 5 is a block diagram of a randomizer used in the physical layer architecture of FIG. 4a;

FIG. 6 is a block diagram of a framing structure for a MPEG-2 transport used in the physical layer architecture of FIG. 4a;

FIG. 7 is a block diagram of a framing structure of packets after randomization for the physical layer architecture of FIG. 4a;

FIG. 8 is a block diagram of a framing structure of a packet having Reed-Solomon encoding for the physical layer architecture of FIG. 4a;

FIG. 9 is a block diagram of a framing structure of packets after interleaving for the physical layer architecture of FIG. 4a;

FIG. 10a is a block diagram of a convolutional interleaver and de-interleaver for the physical layer architecture of FIG. 4a;

FIG. 10b is a block diagram of a byte-to-symbol conversion used by the convolutional interleaver and de-interleaver;

DETAILED DESCRIPTION OF THE EMBODIMENTS

Figure 1:
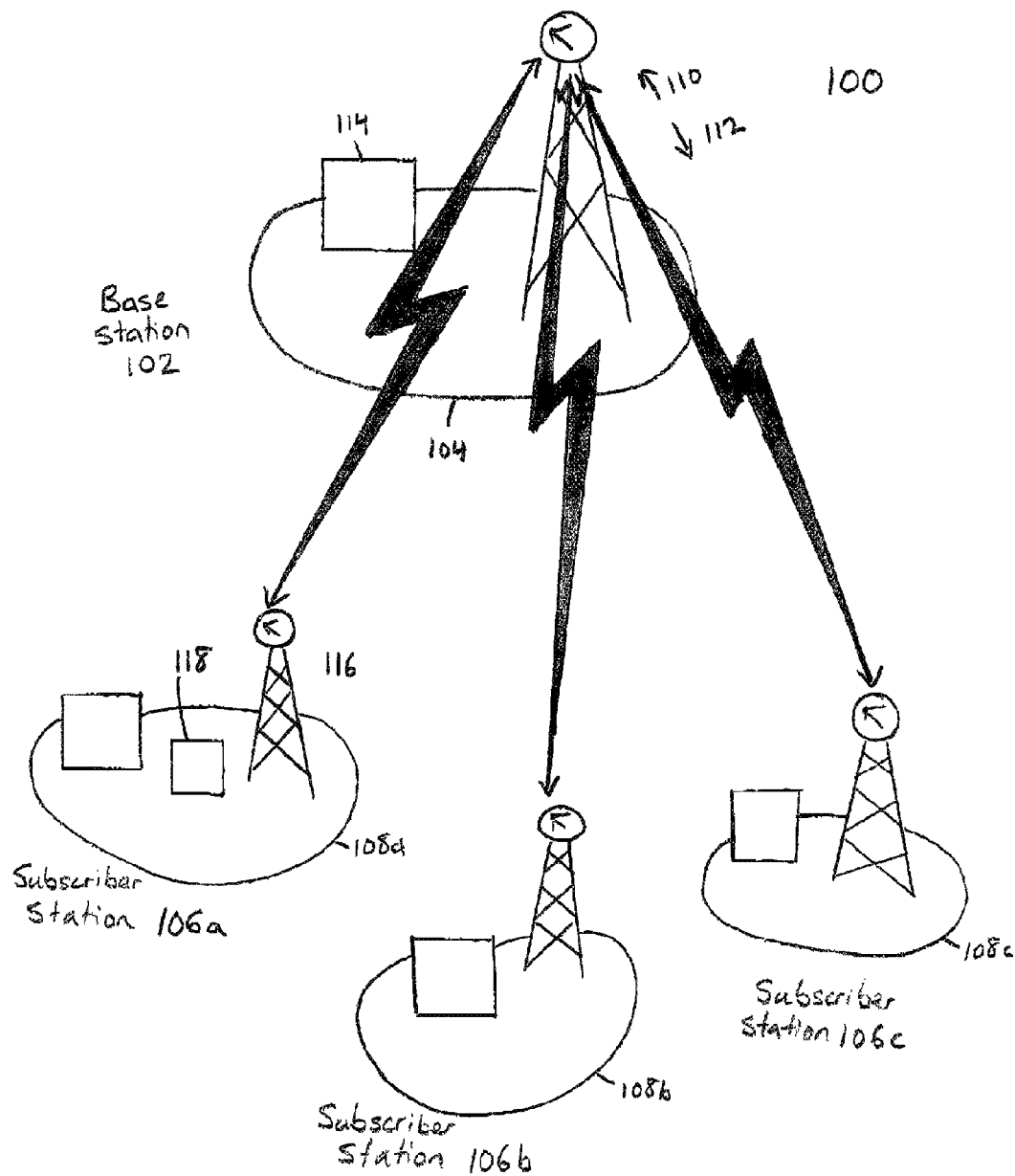
FIG. 1 is a block diagram of a typical BWA network.

The description which follows, and the embodiments therein, are provided by way of illustrating an example, or examples, of particular embodiments of principles of the present invention. These examples are provided for the purpose of explanation, and not limitations, of those principles. In the description which follows, like elements are marked throughout the specification and the drawings with the same respective reference numerals.

To benefit from the robustness of implementation of demonstrated technology, the embodiment utilises aspects of the ETSI-based Digital Video Broadcasting (DVB) standards for satellite broadcasting in the base Station in the downstream channel. Further, to benefit from the robustness of implantation of demonstrated technology, the embodiment utilises aspects of the Data-Over-Cable Service Interface Specifications (DOCSIS) cable modem standard in the upstream channel transmitting from the subscriber station to the base station.

The embodiment also provides physical layer elements addressing communications reliability issues for signals in the 10-60 GHz band.

It will be appreciated that the method and system described herein may be applicable to a communication protocol utilizing the IEEE 802.16 standards known in the art.

Referring to FIG. 1, BWA system 100 is shown comprising base station 102 at a fixed site 104 transmitting to a plurality of subscriber stations 106a, 106b and 106c at sites 108a, 108b and 108c, respectively.

Base station 102 comprises a receive antenna 110 to receive wireless communication signals from subscriber stations 106 and a transmit antenna 112 to transmit wireless communication signals to subscriber stations 106. It will be appreciated that receive antenna 110 and transmit antenna 112 may be physically incorporated into a single antenna (not shown). Base station 102 also comprises communications equipment 114, which receives and transmits wireless communication signals between base station 102 and the subscriber station 106.

Each subscriber station 106 comprises antenna 116 and communication station 118. Antenna 116 receives a wireless communication signal 117 from base station 102 and transmits it through a connection to communication station 118. When communication station 118 generates a message to be transmitted from subscriber station 106 to base station 102, communication station 118 transmits the message through a connection to antenna 116 which, in turns, converts it to another wireless communication 119 signal which is transmitted to base station 102.

Figure 2:
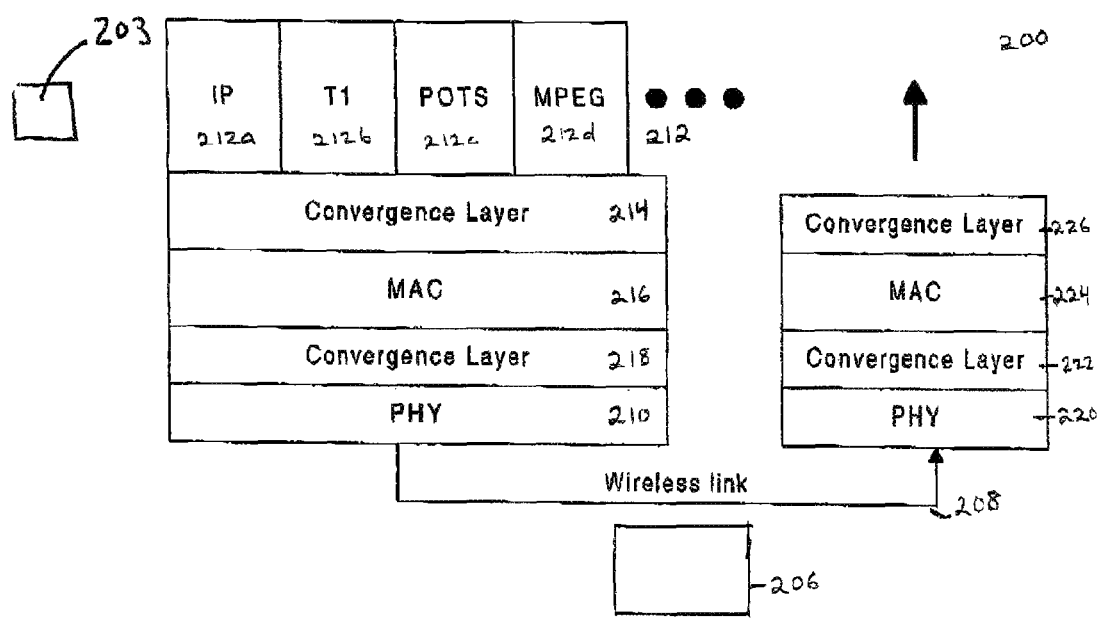
FIG. 2 is a block diagram of a communication layer architecture associated with an embodiment of the invention for the network of FIG. 1.

Referring to FIG. 2, layer model 200 is shown. For base station 102, layer structure 202 defines a communication protocol layer which transforms data 203 originating from sources 212 through various layers ultimately to be transformed into data packets 206. In an embodiment, data packets 206 are MPEG frames. Data packets 206 are transmitted over wireless link 208 to subscriber station 106. At subscriber station 106, layer structure 204 receives MPEG packets 206, transforms them into a form readable by components in physical layer 220, then transforms the data through various layers. Each layer in each side of the communication link is described in turn.

In layer 202 application layer 212 provides data 203 from Internet IP traffic 212a, T1 links 212b, telephone 212c, MPEG 212d, etc. Convergence layer 214 collects data 203 from application layer 212 and maps the data into a single format for downstream MAC layer 216. From MAC layer 216, the data is provided to convergence layer 218. Convergence layer 218 improves demodulation robustness and enables reuse of hardware for different data types (e.g. video, data), Convergence layer 218 then further maps the MAC packets 203 onto the physical layer 210 as physical layer frames. Physical layer 210 processes the frames into MPEG frame 206, which are transmitted over wireless link 208 to the subscriber stations 106.

The upstream physical layer 202 utilizes a combination of time division multiple access (TDMA) and demand assigned multiple access (DAMA) to format communications. In particular, the upstream channel may be divided into a number of "time slots". The number of slots assigned for various uses (polling, contention, guard, or reserved) is controlled by MAC layer 216 and may vary in time for optimal performance. The downstream channel 208 is based upon time division multiplexing (TDM), where the information for each subscriber station 106 is multiplexed onto the same stream of data and is received by all subscriber stations 106 located within the same cell.

The upstream physical layer 202 segments data by frequency division duplexing (FDD), providing a separate frequency assignment for the upstream and downstream channels. Since FDD provides continuous transmission in the downstream channel, advanced receiver and equalizer designs may be used to enable robust, high-order quadrature amplitude modulation (QAM). In addition, the use of orthomode transducer (OMT) technology may be used to provide isolation between the upstream and downstream channels through antenna crosspolarization. This allows the FDD system to be designed with a minimal guard band, which is typically required when using traditional diplexers.

It will be appreciated that the embodiment provides burst-mode transmissions of messages on the upstream channel using a single frequency. However, in operation, when burst mode transmissions are used, synchronization and timing of received signals at subscriber station 106 may be affected.

Accordingly, to achieve re-synchronization and timing of the received signals at each subscriber station 106, preamble data is added to each packet 206 transmitted by base station 102.

There are several embodiment providing preamble data and formats for MPEG packets.

Figure 3A:
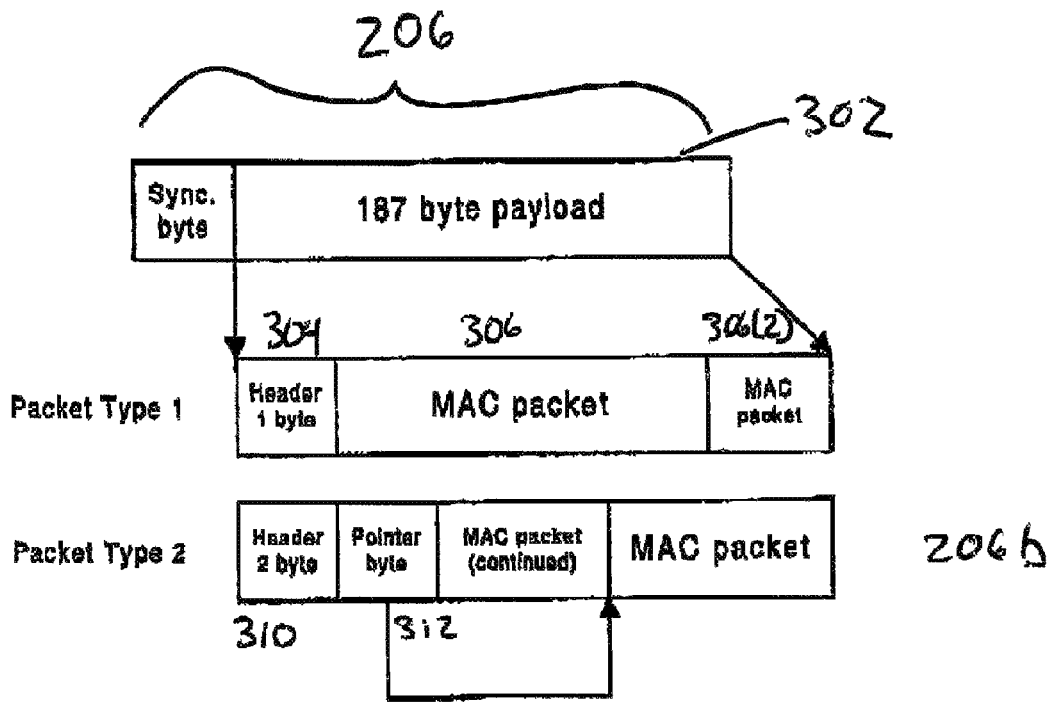
FIG. 3a is a block diagram of an MPEG packet, which may be transmitted via the layer architecture of FIG. 2.

Referring to FIG. 3a, data frame 206 has synchronization byte 300 followed by payload 302 comprising 187 bytes of data. Sync. byte 300 is a fixed 8 bit field with value 01000111b used for frame synchronization.

In one embodiment payload 302a has packet type 1 comprising header byte 304, MAC packet 306 and an additional MAC packet 308. Header 1 byte 304 is used when the first byte following header byte 304 is the beginning of a MAC packet 306. Second MAC packet 308(2) is at the tail end of MPEG frame 206. The bits within header byte 304 have the following functions:

Bit 1: Transport error indicator. When set to "1", it indicates that at least 1 uncorrectable bit error exists in the associated packet.

Bit 2: Payload unit start indicator. This bit is set to "1" to indicate that this is a Packet Type 1, which means that the first byte following the Header byte is the beginning of a MAC packet.

Bit 3: Transport priority. Packets with this bit set to "1" have a higher priority than packets with this bit set to "0".

Bit 4: Frame start indicator. This bit indicates the beginning of a downstream or upstream frame when set to "1". Note that, if framing is not used, or the MAC layer uses a different framing technique, then this bit can be ignored.

Bits 5-8: Reserved for future use.

It will be appreciated that in MPEG frame 206: (i) MAC frames 306 may begin anywhere within an MPEG packet 206, (ii) MAC frames 306 may span MPEG packets 206, and (iii) several MAC frames 306 may exist within an MPEG packet 206.

For additional MAC packet 306(2), Header 2 byte 310 is used when the first byte following the Header byte is not the beginning of a MAC packet. The bits within the header 310 have the following functions:

Bit 1: Transport error indicator. When set to "1", it indicates that at least 1 uncorrectable bit error exists in the associated packet.

Bit 2: Payload unit start indicator. This bit is set to "0" to indicate that this is a Packet Type 2, which means that the first byte following the header byte is a Pointer byte, described below Bit 3: Transport priority. Packets wig this bit set to "1" have a higher priority than packets with this bit set to "0".

Bit 4: Frame start indicator. This bit indicates the beginning of a downstream or upstream frame when set to "1". Note that, if framing is not used, or the MAC layer uses a different framing technique, then this bit can be ignored, Bits 5-8: Reserved for future use, Pointer byte 312 follows Header 2 byte 310 and indicates the byte number corresponding to the last byte in the partial MAC packet 306(2) that resides at the beginning of the current MPEG-2 frame 206.

Figure 3B:
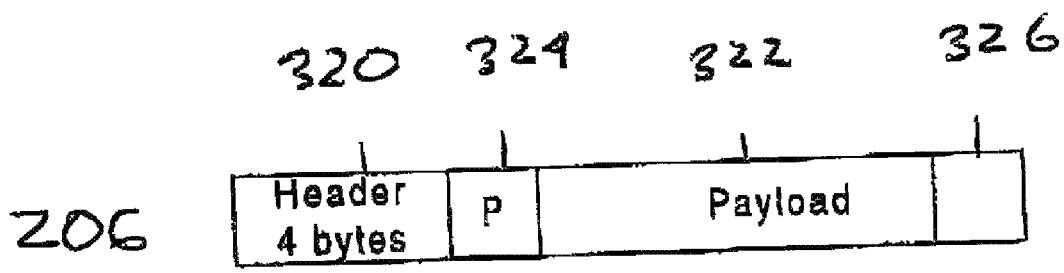
FIG. 3b is another block diagram of an MPEG packet, which may be transmitted via the layer architecture of FIG. 2.

Referring to FIG. 3b, in another embodiment the frame 206 is a continuous series of 188-byte MPEG packets, comprising a 4-byte header 320 followed by payload 322 having 184 bytes of data. The header 320 identifies the payload 322 as containing MAC messages or other types of payloads, including digital video. The mixture of the various services that are transported in the downstream are controlled by base station 102.

For header 320, its field values are defined in Table A, where the field names are from the ITU specification. The format of header 320 used on a PID may be restricted to values listed in Table A. The format of header 320 conforms to the MPEG standard. In the embodiment, header 320 does not allow inclusion of an adaption_field in the MPEG packets 206.

TABLE A

MPEG Header Format for 802.16 MAC packets

| Length | Field (bits) | Description |
| --- | --- | --- |
| Sync byte | 8 | 0x47 or 0xB8; MPEG Packet sync byte |
| Transport_error_indicator | 1 | Indicates an error has occurred in the reception of the packet. This bit is reset to zero by the sender, and set to one whenever an error occurs in the |

TABLE A-continued

MPEG Header Format for 802.16 MAC packets

| Length | Field (bits) | Description |
| --- | --- | --- |
| | | transmission of the packet. |
| Payload_unit_start_indicator (PUSI) | 1 | A value of one indicates the presence of a pointer_field as the first byte of the payload (fifth byte of the packet). |
| Transport_priority (frame_start_indicator) | 1 | This bit is set to 1 to indicate the beginning of a downstream frame, when framing is used. |
| PID | 13 | 802.16 well-known packet ID (TBD) |
| Transport_scrambling_control | 2 | Reserved, set to '00' |
| Adaptation_field_control | 2 | '01'; use of the adaption_field is not allowed on the 802.16 PID |
| Continuity_counter | 4 | Cyclic counter within this PID |

The payload 322 of the MPEG packet 206 may carry 802.16 MAC frames 306. The first byte of the MPEG payload will be a 'pointer_field' 324 if the PUSI is set. A stuff_byte pattern having a value of 0x.FF may be used within payload 320 to fill any gaps between the MAC frames 306 as shown at 326. (If no MAC packets are available at the beginning of the MPEG-2 frame 306, then "idle" MAC packets may be transmitted, which are defined by the MAC layer 216.) The value of 0xff is chosen as an unused value for the first byte of 802.16 MAC frame 306 which does not have this value. The pointer_field 324 is present as the fifth byte of the MPEG packet 206 whenever the PUSI is set to one in the MPEG header.

Pointer_field 324 contains the number of bytes in this packet that immediately follow the pointer_field that decoder in subscriber station 106 must skip past before looking for the beginning of an 802.16 MAC frame 306. Details on the decoder are provided later. Pointer_field 324 may be present if possible to begin 802.16 MAC frame 306 in the packet, and should point to either:

1. The beginning of the first MAC frame to start in the packet or
2. To any stuff byte preceding the MAC frame.

Referring to FIG. 3c-3, the PUSI flag indicates the presence of the pointer_field as the first byte of the MPEG payload 206.

FIG. 3c shows a MAC frame 306 positioned immediately after the pointer_field byte 324, In this case, pointer_field 324 is zero, and the decoder in the physical layer will begin searching for a valid MAC header byte at the byte following the pointer field.

FIG. 3d illustrates a MAC frame 306d preceded by the tail of a previous MAC frame 306c and a sequence of stuffing bytes 326. Here, the pointer_field 324d identifies the first byte after the tail of Frame #1 (a stuff_byte) as the position where the decoder begins searching for a MAC header byte. The format allows multiplexing in base station 102 to immediately insert a MAC frame that is available for transmission if that frame arrives after the MPEG header and pointer field has been transmitted.

To facilitate multiplexing of the MPEG packet stream carrying data with other MPEG encoded data, base station 102 should not transmit MPEG packets with the PID which contain only stuff bytes in payload. Instead MPEG null packets should be transmitted.

FIG. 3e illustrates multiple MAC frames 306e, f, g contained within an MPEG packet. MAC frames may be concatenated one after the other or be separated by an optional sequence of stuffing bytes 326.

FIG. 3f illustrates a MAC frame 306f spanning multiple MPEG packets. Here, the pointer_field 324e of the succeeding frame points to the byte following the last byte of the tail of the first frame.

The control bytes added to data 203 in convergence layer 218 allow a downstream channel to follow a virtual framing structure. This simplifies bandwidth allocation for applications requiring constant bit rate services, such as T1/E1, POTS, or video conferencing The degree of similarity between downstream frames and upstream frames may be controlled by MAC layer 214. Frames may also be used to simplify functions, such as time slot allocation and upstream timing adjustment, Referring to FIG. 4a, further detail of elements in physical layer 210 are provided. In downstream communications physical layer 210, base station 102 receives data packets 203 from convergence layer 218 at the baseband interface unit 402. Unit 402 formats packets 203 for use by elements in physical layer 210. Next, data packets 203 are randomized by sync 1 byte inversion and randomization unit 404. Next, data 203 is encoded using a (204,188) Reed-Solomon code through data encoding unit 406 over GF(256). Next, data 203 goes through downstream convolution interleaving unit 408 having various depths to support different delay requirements. An inner convolutional code is provided in interleaving unit 408 to support different channel configurations. Then, bits are mapped at the downstream convolution coding unit 410. Next, symbols are filtered with the downstream baseband pulse shaping unit 412. Finally symbols are modulated at the downstream modulator and physical interface unit 414 for transmittal on the RE channel. Further detail on selected units is provided in turn.

Figure 5:
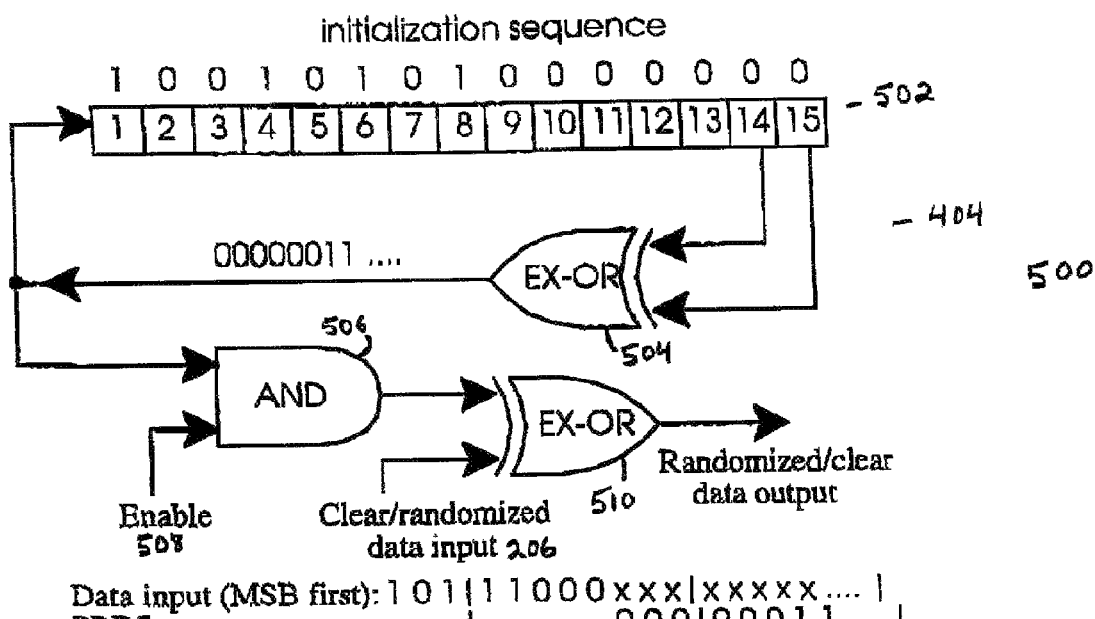

Referring to FIG. 5 the Sync 1 inversion and randomization unit 404 inverts the Sync 1 byte of packet 206 according to the MPEG-2 framing structure, and randomizes the frame for spectrum shaping purposes. Randomization minimizes the possibility of transmitting unmodulated carriers and ensures adequate numbers of bit transitions to support clock recovery. The downstream packets 206, excluding sync bytes, are randomized by modulo-2 addition of the data with the output of the Pseudo Random Binary Stream (PBRS) generator. The PBRS is initialized at each inverted sync byte by the sequence 100101010000000 as shown. The sync byte (hex 47) is inverted (hex B8) every eight packets, starting at the beginning of the frame. The generator polynomial for the PRBS is:

$$1+X^{14}+X^{15}$$

Randomizer 500 provides a logic arrangement to process the data frame 206. Initialization sequence 502 is the code which is used to randomize the data frame 206. The initialization sequence 502 is fed to XOR gate 504, The output of XOR or gate 504 is sent to an input of AND gate 506. An enable signal 508 is provided to another input of AND gate 508 and the output of AND gate 508 is provided to XOR gate 510. Data frame input 206 is provided to the other input of XOR gate 510. The output of XOR gate 510 is the output of the randomizer 500.

Following initialization, the first PRBS generator output bit is added to the first bit following the inverted synchronization bit. Over subsequent sync bytes, the PBRS generator continues to step its internal shift register state but the PBRS output addition to the sync byte bits is disabled. Accordingly, the period of the PRBS sequence is 1504 bytes.

Figure 6:
Figure 7:
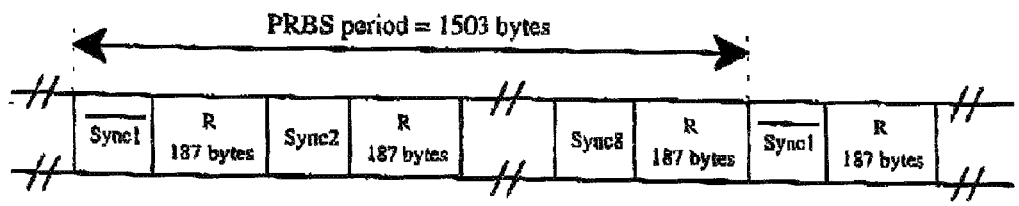

FIG. 6 illustrates the initial framing structure of the MPEG-2 packet 306, and FIG. 7 shows the packets 306 with Sync bytes after randomization.

Figure 4A:
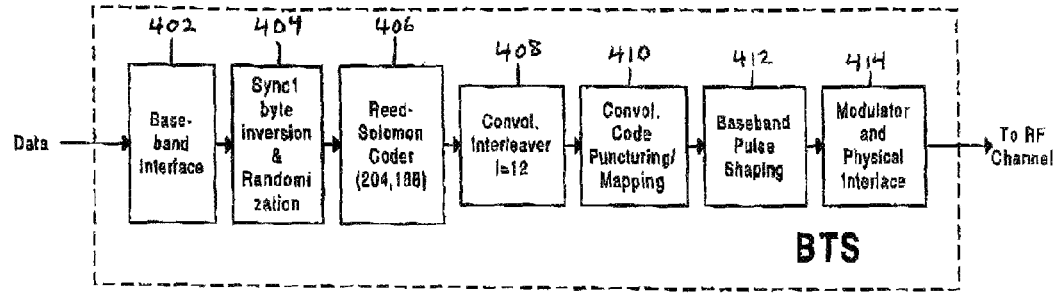
FIG. 4a is a block diagram of elements of the physical layer architecture at a base station transmitting downstream communications using the embodiment of FIG. 2.
Figure 8:
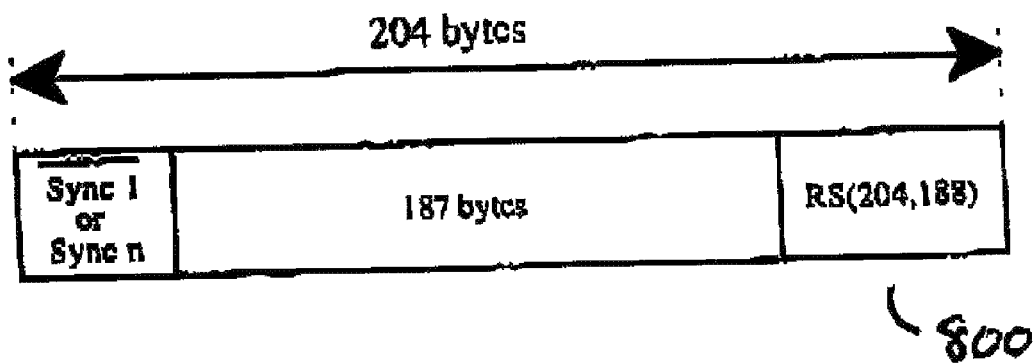

Referring to FIG. 4a, in coder 406, using an energy dispersal randomization process, shortened Reed-Solomon encoding is performed on each randomized MPEG-2 transport packet at the downstream data encoding unit 406, with T=8. Accordingly, 8 erroneous bytes per transport packet may be corrected. Coder 406 adds 16 parity bytes to the MPEG-2 transport packet to produce a codeword (204,188). Reed-Solomon coding is also applied to the packet sync byte, either non-inverted (i.e. 47 hex) or inverted (i.e. B8 hex), The Reed-Solomon code has the following generator polynomials:

Code Generator Polynomial: $g(x)=(x+\mu^0)(x+\mu^1)(x+\mu^2)\ldots(x+\mu^{15})$, where $\mu=02$ hex Field Generator Polynomial: $p(x)=x^8+x^4+x^3+x^2+1$ Referring to FIG. 8, the shortened Reed-Solomon code is implemented by appending 51 bytes 800, all set to zero, before the information bytes at the input of a (208,188) encoder; after the coding procedure these bytes are discarded.

Referring to FIGS. 10a and 10b, convolutional interleaving of data occurs at convolution interleaving unit 408. This convolutional interleaving unit utilizes a Forney algorithm, which is compatible with the Ramsey type III algorithm having a programmable depth of I=1, 3, 6, or 12. The interleaved frame is composed of overlapping error-protected packets and is delimited by MPEG-2 sync bytes (to preserve a periodicity of 204 bytes).

Figure 9:
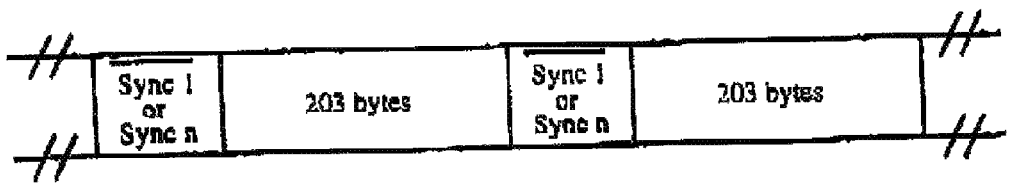

FIG. 9 shows an exemplary stream interleaved packets with depth I=12.

Referring to FIGS. 10a and 10b, interleaver 408 has I branches 1002, cyclically connected to the input byte-stream by the input switch 1004. Each branch comprises a First In First Out (FIFO) shift register 1006, with depth (M) cells (where $M=N/I_{max}$, N=204=error protected frame length $I_{max}$=12=maximum interleaving depth, j=branch index). The cells of the FIFO contain 1 byte, and the input switches 1004 and output switches 1008 is synchronized.

For synchronization purposes, the sync bytes and the inverted sync bytes are routed to the branch "0" of the interleaver 408 (corresponding to a null delay). The de-interleaver is similar to interleaver, but its branch indexes are reversed; accordingly, j=0 provides to the largest delay, Synchronization at the de-interleaver 1008 is achieved by routing the first recognized sync byte into the 0 branch.

For convolutional coding unit 410 selects a convolutional code from Table B of code rates, which are obtained by puncturing a rate ½ constraint length K=7 code having the following generator vectors g, and puncturing patterns P (0 denotes punctured (deleted) bit).

Figure 12:
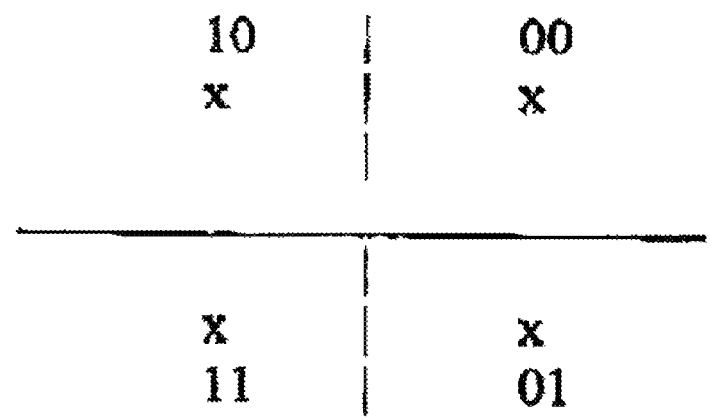
FIG. 12 is a QAM constellation diagram for a QAM encoder.

When convolutional coding is utilized with QPSK modulation, QPSK signals use gray-coded direct mapping (no differential encoding) of (I,Q) from bit pairs out of the convolutional encoder as shown in FIG. 12.

It will be appreciated that 16-QAM and 64-QAM may be supported using differential encoding and symbol mappings as defined by ITU-T J.83. These mappings utilize assume an inner code rate of 1 (i.e., no inner convolutional coding).

The use of pragmatic trellis coding may be supported when 8-PSK or 16-QAM modulations are used. This method of inner coding uses the same constraint length K=7 convolutional code defined above. Note that trellis coding may be modified to support other rates and/or constellations without significantly changing the basic modulator and demodulator architecture.

When inner convolutional code is not used, then the mapping of bits to symbols uses a differential end coder and mapper, The two most significant bits (MSBs) of each symbol shall be differentially coded to obtain a $\cup \div 2$ rotation-invariant QAM constellation. The differential encoding of the two MSBs is given by the following Boolean expression:

$$I_k = \overline{(A_k \oplus B_k)} \cdot (A_k \oplus I_{k-1}) + (A_k \oplus B_k) \cdot (A_k \oplus Q_{k-1})$$

$$Q_k = \overline{(A_k \oplus B_k)} \cdot (B_k \oplus Q_{k-1}) + (A_k \oplus B_k) \cdot (B_k \oplus I_{k-1})$$

Figure 13:
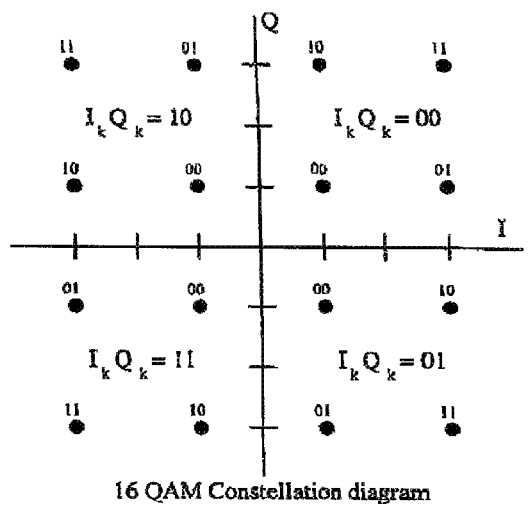
FIG. 13 shows the bit-to-symbol mapping for 16-QAM to 64-QAM.
Figure 13:
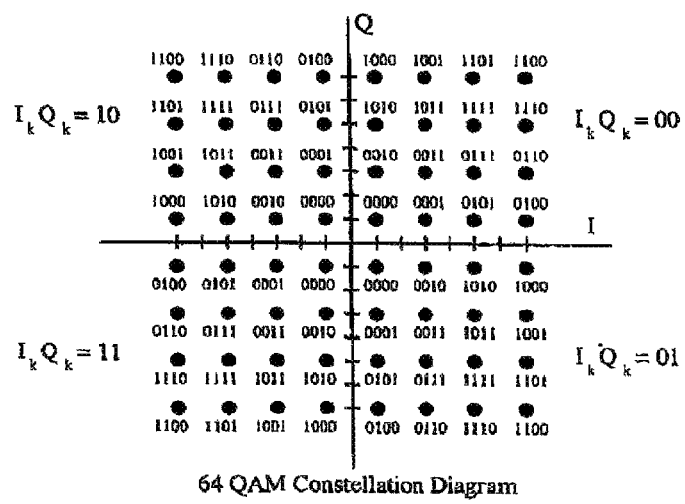

For QPSK, the output of the differential encoder may map directly to the QPSK signal constellation based on the quadrant to MSB mapping as shown in FIG. 13 with the mapping of bits to symbols for 16-QAM and 64-QAM.

| Conversion of constellation of quadrant 1 to other quadrants of the constellation diagrams given in the following diagrams. | | |
|---|---|---|
| Quadrant | MSBs | LSBs rotation |
| 1 | 00 | 0 |
| 2 | 10 | $+\pi/2$ |
| 3 | 11 | $+\pi/$ |
| 4 | 01 | $+3\pi/2$ |

For base and shaping unit 412, prior to modulation, the I and Q signals are filtered by square-root cosine filters. The excess bandwidth factor a may be set between 0.15 to 0.35. The square-root raised cosine filter is defined by the following transfer function:

TABLE B

| | | | Code rates | | | | | | | | |
|---|---|---|---|---|---|---|---|---|---|---|---|
| Original code | | | 1/2 | | 2/3 | | 3/4 | | 5/6 | | 7/8 |
| K | $G_1$ | $G_2$ | P | $d_{free}$ | P | $d_{free}$ | P | $d_{free}$ | P | $d_{free}$ | P | $d_{free}$ |
| 7 | $171_{ocl}$ | $133_{ocl}$ | X = 1<br>Y = 1<br>I = $X_1$<br>Q = $Y_1$ | 10 | X = 10<br>Y = 11<br>I = $X_1Y_2Y_3$<br>Q = $Y_1X_3Y_4$ | 6 | X = 101<br>Y = 110<br>I = $X_1Y_2$<br>Q = $Y_1X_3$ | 5 | X = 10101<br>Y = 11010<br>I = $X_1Y_2Y_4$<br>Q = $Y_1X_3X_5$ | 4 | X = 1000101<br>Y = 1111010<br>I = $X_1Y_2Y_4Y_6$<br>Q = $Y_1Y_3X_5X_7$ | 3 |

NOTE:

1 = transmitted bit

0 = non transmitted bit $$H(f) = 1 \quad \text{for } |f| < f_N(1-\alpha) \quad (1)$$

$$\left\{ H(f) = \left\{ \frac{1}{2} \sin\frac{\pi}{2f_N} \left[ \frac{f_N - |f|}{\alpha} \right] \right\}^{\frac{1}{2}} \quad \text{for } f_N(1-\alpha) \leq |f| \leq f_N(1+\alpha) \right.$$

$$H(f) = 0 \quad \text{for } |f| > f_N(1+\alpha)$$

For upstream data transmissions, MAC packets 206 are transported over wireless link 208, so no upstream convergence sublayer is needed. The upstream channel is TDMA based and the channel is modelled as a continuous sequence of "time slots". The smallest slot of which is called a "mini-slot". Following are art having the following restrictions:

a) mini-slots size is $4*2^n$ bytes, where n 0, 1 . . . , 7. This provides wide range of time slot sizes and symbol rates;

b) The upstream channel is divided into equal length "virtual" frames. This allows simplified calculations of symbol rates, bandwidth allocations, and transmit timing synchronization. In the embodiment, the frame time are programmable in steps of 125 usec (typically in the range of 3-6 msec), and the frame boundaries are determined from a downstream frame start indicator or MAC management messages. The upstream frame contains an integer number of mini-slots; and c) The subscriber station transmitter must be able to support at least 6 programmable "burst" configurations.

Figure 4B:
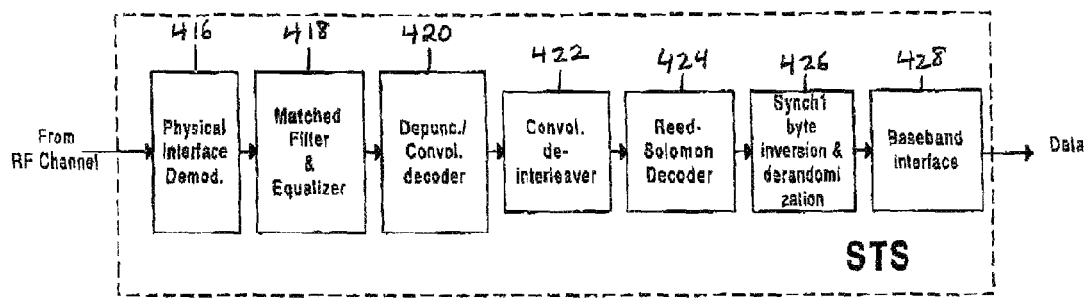
FIG. 4b is a block diagram of elements of the physical layer architecture at a subscriber station in receiving downstream communications using the embodiment of FIG. 2.

Referring to FIG. 4b elements of physical layer 204 at subscriber station 106 are similar to the elements of physical layer 206 except the modules are arranged in reverse order for inverse operation of the elements of physical layer 204 so that the MAC packet 208 may be reconstructed from the data received over the RF channel.

The transmitted signal is received at the downstream subscriber station 106 at the physical interface and demodulator unit 416. Matched filter and equilizer unit 418 filters and equilizes the data. Next, data is sent to Depunct./convolution de coder 420. Next, the processed data is sent to Reed-Solomon de coder 426, and to sync 1 byte inversion and de-randomization unit 426. The reconstructed MAC packet is then available at baseband interface 428 of the downstream subscriber station 106.

Figure 11:
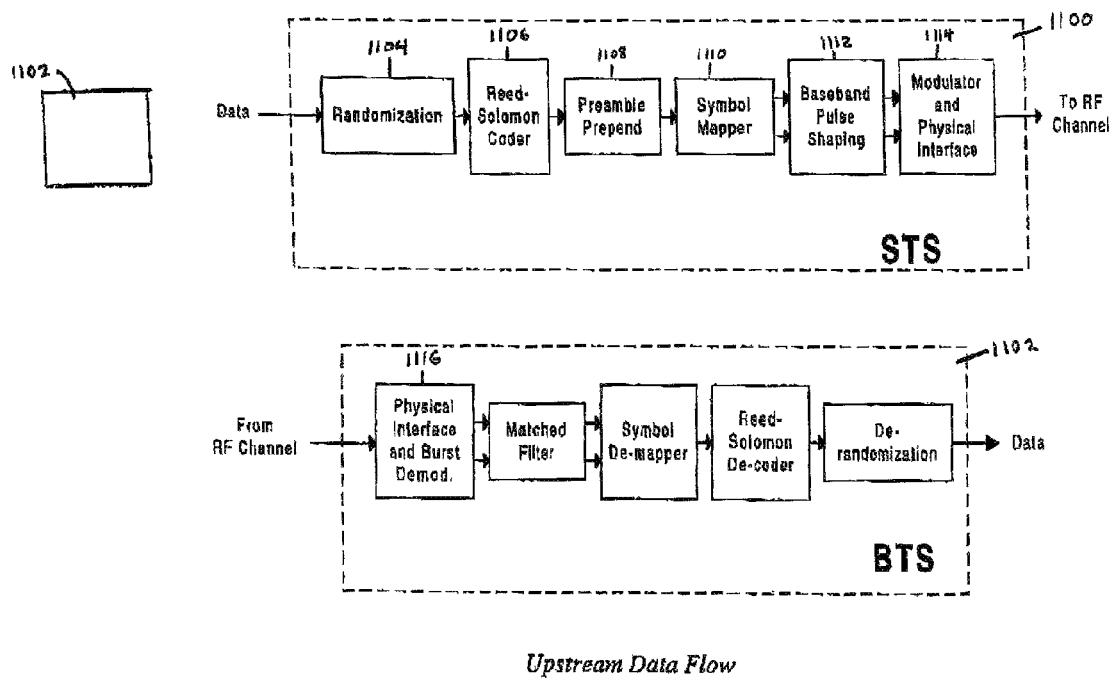
FIG. 11 is a block diagram of an exemplary implementation of the physical layer of the system of FIG. 1 in upstream communication.

Referring to FIG. 11, for upstream transmissions from subscriber station 106 to base station 102, the upstream physical layer is based on the transmission of bursts, with several parameters that are programmable by the MAC. Each burst is designed to carry IEEE 802.16 MAC messages of variable lengths, which are first randomized and then encoded using a Reed-Solomon encoder based on GF(256). The length of the codeword and the error correction capability of the code are programmable by the MAC messages coming from the base station via a burst configuration message. Each burst also contains a variable length preamble and a variable length guard space at the end of the burst. The preamble and coded bits are mapped to QPSK or 16-QAM constellations, where the support of 16-QAM is optional. Nyquist pulse shaping using a square-root raised cosine filter is also employed with a roll-off factor, which is programmable from 0.2 to 0.3.

Elements of an exemplary upstream physical layer 1100 are shown. For an upstream packet 1102, the contents of the MAC packet are randomized by randomization unit 1104, providing a linear feedback shift register (LFSR) with a generating polynomial having up to 16 taps. The initial contents of the register shall also be programmable, and the LFSR may be reset to initial condition at the beginning of each MAC packet 1102.

In Reed-Solomon coding module 1106, Reed Solomon coding is applied to each randomized MAC packet 1102. The code is a shortened, systematic Reed-Solomon code generated from GF(256) with codeword lengths (N) of between 4 to 255 bytes, and error correction capability able to correct up to ten byte errors. The specified code generator polynomials are given by:

Code Generator Polynomial:

$$g(x)=(x+\mu^0)(x+\mu^1)(x+\mu^2)\ldots(x+\mu^9),$$

where $\mu.=02$ hex

Field Generator Polynomial: $p(x)=x^8+x^4+x^3+x^2+1$

The specified code has a block length of 255 bytes, and may be configured as a Reed-Solomon (255,255-2T, T) code with information bits preceded by (255-N) zero symbols.

The upstream preamble pre-pender unit 1108 maybe programmable in length from 0-1024 bits having a programmable value.

Figure 14:
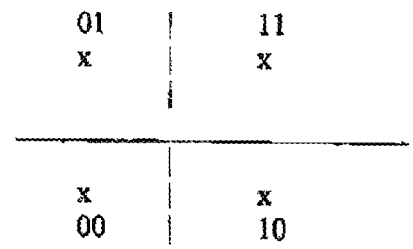
FIG. 14 is a constellation diagram for a differential QAM encoder.

Symbol mapper 1110 supports QPSK, and may support 16-QAM. For mapper 1110, a differential encoder accepts bits A and B in sequence and generates phase changes as follows:

| The mapping of bits to symbols is as shown in FIG. 14. | | |
|---|---|---|
| A | B | Phase Change |
| 0 | 0 | None |
| 0 | 1 | +90 degrees |
| 1 | 1 | 180 degrees |
| 1 | 0 | −90 degrees |

Figure 15:
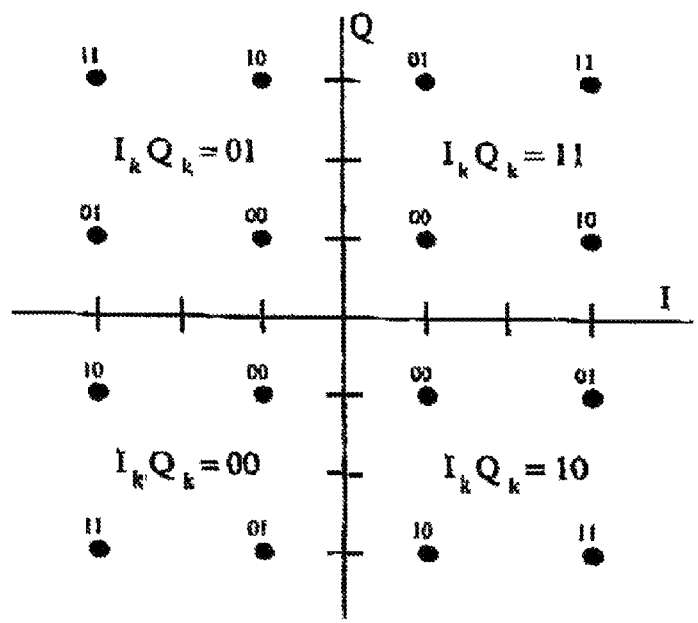
FIG. 15 shows a differentially encoded QA constellation diagram.

If differential encoding is used for 16-QAM, then the signal constellation shown in FIG. 15 should be used (I1 Q1 I0 Q0 represent the bits identifying the 16-QAM symbol).

| Gray-coded 16-QAM | | | |
|---|---|---|---|
| Current Input Bits I1 Q1 | Quadrant Phase change | MSBs of Previous Transmitted Symbol | MSBs for Currently Transmitted Symbol |
| 00 | 0° | 11 | 11 |
| 00 | 0° | 00 | 00 |
| 00 | 0° | 10 | 10 |
| 01 | 90° | 11 | 01 |
| 01 | 90° | 01 | 00 |
| 01 | 90° | 00 | 10 |
| 01 | 90° | 10 | 11 |
| 11 | 180° | 11 | 00 |
| 11 | 180° | 01 | 10 |
| 11 | 180° | 00 | 11 |
| 11 | 180° | 10 | 01 |
| 10 | 270° | 11 | 10 |
| 10 | 270° | 01 | 11 |
| 10 | 270° | 00 | 01 |
| 10 | 270° | 10 | 00 |

Figure 16:
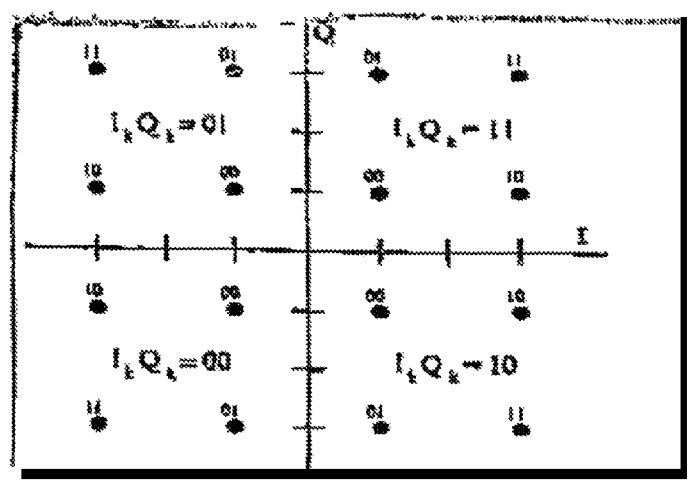
FIG. 16 shows a signal constellation for Gray-coded 16-QAM.

When differential encoding is not supported, then the signal constellation of Gray-coded 16-QAM shown in FIG. 16 may be used.

In baseband pulse shaping unit 1112, prior to modulation, the I and Q signals are filtered by square-root raised cosine filters. The excess bandwidth factor α is programmable from 0.2-0.3. The square-root raised cosine filter is defined by the following transfer function:

$$H(f) = 1 \quad \text{for } |f| < f_N(1-\alpha) \quad (2)$$
$$\left\{ H(f) = \left\{ \frac{1}{2} \sin \frac{\pi}{2f_N} \left[ \frac{f_N - |f|}{\alpha} \right] \right\}^{\frac{1}{2}} \quad \text{for } f_N(1-\alpha) \le |f| \le f_N(1+\alpha) \right.$$
$$H(f) = 0 \quad \text{for } |f| > f_N(1+\alpha)$$

where $f_N = \frac{1}{2T_s} = \frac{R_s}{2}$ is the Nyquist frequency.

For modulator and physical interface unit 1114, the following parameters and their ranges may be used to configure the necessary upstream channel. These parameters may be sent in MAC messages from base station 102.

| Parameter description | Parameter needed from MAC | Meaning |
| --- | --- | --- |
| Frame time | 0-255 (N) | Frame time is N × 125 usec |
| Mini-slots per frame | 0-65,535 (M) | Number of 4-byte mini-slots per frame |
| Symbols per minislot | 0-32 (Q) | Number of symbols per minislot time |
| Upstream symbol rate | — | Rs = Q × M (N × 125 usec) |
| Roll-off factor | TBD | |
| Upstream frequency | TBD | |

The upstream transmitter may be save at least 6 burst profiles, each of which contain the following information:

| Parameter description | Parameter needed from MAC |
| --- | --- |
| Modulation | 2 = QPSK, 4 = 16-QAM |
| Preamble length | 0-1024 bits |
| Preamble pattern | 0-1024 bits |
| RS codeword length | 4-255 bytes |
| Error correction of codeword | 0-10 bytes |
| Last codeword length | 1 = fixed; 2 = shortened (optional) |
| Guard time | 0-255 symbols |
| Num, codewords in burst | 0-255 |
| Scrambler seed | 16 bits |
| Differential encoding | on/off |
| Scrambler | on/off |

Finally for modulator and physical interference unit 1114 modulates packet 1102 onto an appropriate frequency for transmission onto a RF channel.

Synchronization for frame and slot transmissions is provided with an output reference clock from downstream demodulator 1116 that is derived from the downstream symbol clock. The reference clock may be used by subscriber station 106 to provide timing for rate critical interfaces when the downstream clock is locked to an accurate reference at the base station. A time-stamp based method may be used if the desired clock accuracy is sufficient for the services provided, A subscriber station timer from the downstream symbol clock or an internal oscillator with time stamps originating from the MAC layer at base station 102 may also be provided.

In order to provide a time slot reference for the upstream channel, the upstream and downstream channels are divided into equal and fixed length frames. The beginning of the downstream frame may identified by the frame start indicator bit in the downstream transmission convergence sublayer Header byte. The beginning of the upstream frame may be a fixed offset from the downstream frame start message, programmed via a MAC message. Accurate upstream time slot synchronization may be supported through a ranging calibration procedure defined by the MAC layer to ensure that upstream transmissions by multiple users do not interfere with each other. Therefore, the physical layer needs to support accurate timing estimates at the base station 102, and the flexibility to finely modify the timing at the subscriber station 106.

Transmission frequency control is also provided. Due to the large carrier frequencies proposed for BWA systems, frequency errors occur in the radio units, and transmission frequency also vary with equipment age and operating temperature. Note that the initial ranging process described for timing adjustment may be used for initial frequency and power calibration. After the initial frequency has been calibrated, it is expected that periodic measurements of the frequency offset value at base station will be made by the physical layer and sent to the subscriber station via a MAC message, enabling low cost frequency references to be used in the radio units.

As with frequency control, a power control algorithm may be used for the upstream channel with both an initial calibration and periodic adjustment procedure within the radio subsystem control. The base station can measure the power in the received burst signal, This measurement may be compared against a reference level, and the resulting error can be fed back to the subscriber station in a calibration message coming from the MAC layer. The power control algorithm can be configured to support rain fade rates of at least 5 dB/second with depths on the order of 30 dB.

The transmission protocol associated with the embodiment supports half-duplex FDD (H-FDD) and TDD, thereby reducing the cost of the radio unit and allowing operation in narrow channels that do have enough separation between the downstream and upstream channels. This protocol is most suited for the downstream channel, since the upstream channel can still be TDMA based, utilizing programmable bursts and time slots.

It will be appreciated that subscriber station 106 may support only FDD operation or FDD/H-FDD/TDD operation providing lower equipment costs in FDD stations.

The following configuration for subscriber station 106 supports an H-FDD or TDD system:

1. The downstream channel is divided into equal length frames, which contain and integer number of MPEG-2 packets. Any required guard time needs to be accounted for in the upstream and downstream framing, which is controlled by the MAC layer 216.
2. The downstream physical layer 210 is similar to the FDD physical layer 220 with the following differences in the first MPEG-2 packet 206 in the frame:
   a. A variable length preamble replaces the synchronization byte that can be used to derive framing and equalizer coefficients, if needed.
   b. The randomizer operates during the preamble (as if does for the synch. byte) in order to maintain randomizer synchronization; however the output of the randomizer is disabled for the preamble.
   c. The Header byte(s) follow the preamble to identify the location of the MAC packets.

d. The preamble, Header bytes and payload (totalling 188 bytes) are encoded using a (204,188) Reed-Solomon code.
3. The subsequent MPEG-2 packets use the synchronization byte and Header bytes as defined for the FDD system.
4. The convolutional interleaver is disabled (i.e., I=1).
5. Inner convolutional coding and/or trellis coding is disabled (i.e., a rate of I).
6. Pulse shaping and modulation is selectable.
7. The length of the preamble and the preamble value are standardized.
8. The subscriber station 106 terminal can be configured to operate in an FDD or H-FDD/TDD system upon installation.

It will be appreciated that the invention may provide a plurality of different variables which may be programmed for the downstream channel, including interleaver depth, inner coding option, modulation, differential encoding, roll-off factor and symbol rate, It will be appreciated that the plurality of different variables may be set during installation of the communications system.

It will also be appreciated that the invention may allow the MAC to carry everything. Accordingly, the MAC may handle MPEG-2 broadcast packets, thereby freeing the invention from processing them.

It will also be appreciated that the invention may provide a method of generating symbol rates allowing a large number of programming options. The programming options may be supported in the MAC.

It will also be appreciated that the invention may support the use of framing of the upstream and downstream channels.

It will also be appreciated that the invention may support 16-QAM with trellis coding and/or 16-QAM with differential encoding and no inner code.

It will further be appreciated that the invention may support continuous downstream transmission.

It is noted that those skilled in the art will appreciate that various modifications of detail may be made to the preferred embodiments described herein, which would come within the spirit and scope of the invention as defined in the following claims.

We claim:

1. A method of establishing communication across a broadband wireless access communication network between a base station and a subscriber station, said method comprising:
    at said base station,
    (a) broadcasting over a downstream channel physical layer downstream frames to the subscriber station and
    (b) receiving from the subscriber station a respective burst of physical layer upstream frames on an upstream channel;
    at the subscriber station,
    (c) extracting the downstream frames addressed to the subscriber station in said downstream channel and
    (d) transmitting to said base station the respective burst of upstream frames in assigned time-slots allocated to said subscriber station in the upstream channel; and
    (e) transmitting the upstream channel and the downstream channel between said base station and said subscriber station using a specified duplexing technique,
    wherein the downstream channel uses a time division multiplexing (TDM) transmission protocol, and the upstream channel uses a time division multiple access (TDMA) protocol, and
    wherein the downstream frames have a fixed length including a configurable-length payload field containing at least one MAC packet or fragment thereof and a preamble field including a header indicating whether the data in the payload following the header represents a new MAC packet or a tail end of a MAC packet continued from a previous frame, and wherein at least when said header indicates that the data in the payload following the header represents a tail end of a MAC packet, said preamble further includes a pointer indicating the position of the start of a new MAC packet within the frame.

2. A method as claimed in claim 1, wherein an upstream frame extends over a time range of 3-6 milliseconds.

3. A method as claimed in claim 1, wherein the boundaries of said downstream frames are determined from a downstream frame start indicator received from said base station.

4. A method as claimed in claim 1, wherein the boundaries of said downstream frame are determined using a MAC management message.

5. A method as claimed in claim 1, wherein said preamble is programmable in length from 0 to 1024 bits.

6. A method as claimed in claim 1, wherein said burst has a plurality of programmable burst profiles, determined by one or more of: the modulation type used on said upstream channel, the length and pattern of said preamble, the length of the last codeword in the burst, the number of codewords in the burst, the seed used for randomization.

7. A method as claimed in claim 6, wherein said burst profiles are further determined by use or not of differential encoding and use or not of randomization.

8. A method as claimed in claim 1, further comprising synchronizing said upstream frame within a timeslot on said upstream channel with an output reference clock derived from a downstream symbol clock received from said base station.

9. A method as claimed in claim 1, wherein said upstream and said downstream channels are divided into equal and fixed length frames, wherein the beginning of each downstream frame is identified by a frame start indicator bit and the beginning of each upstream frame is a fixed offset from a downstream frame start message, programmed via a MAC message.

10. A method as claimed in claim 1, wherein said duplexing technique used in step (e) is selected from the group consisting of time division duplexing (TDD) and frequency division duplexing (FDD).

11. A method as claimed in claim 10, wherein said frequency division duplexing (FDD) technique supports half duplex subscriber stations (H-FDD) and full duplex (FDD) subscriber stations.

12. A method as claimed in claim 10, wherein in the case of TDD, one radio channel carries both upstream and downstream frames and control data between said base station and said subscriber station uses.

13. A method as claimed in claim 10, wherein in the case of FDD a first radio channel carries the upstream frames and a second radio channel carries the downstream frames.

14. A method as claimed in claim 1, wherein said base station operates in a burst mode, for transmitting said downstream frames in downstream bursts.

15. A method of establishing communication across a broadband wireless access communication network between a base station and a subscriber station, said method comprising:
    at said base station,
    (a) broadcasting over a downstream channel physical layer downstream frames to the subscriber station and (b) receiving from the subscriber station a respective burst of physical layer upstream frames on an upstream channel;

at the subscriber station, (c) extracting the downstream frames addressed to the subscriber station in said downstream channel and (d) transmitting to said base station the respective burst of upstream frames in assigned time-slots allocated to said subscriber station in the upstream channel; and (e) transmitting the upstream channel and the downstream channel between said base station and said subscriber station using a specified duplexing technique, wherein the downstream channel uses a time division multiplexing (TDM) transmission protocol, and the upstream channel uses a time division multiple access (TDMA) protocol, wherein the downstream frames have a fixed length including a configurable-length payload field, and wherein step a) comprises:

converting downstream data packets destined to said subscriber station from a respective protocol into said physical layer downstream frames;

randomizing the data into said downstream frames for spectrum shaping;

encoding the data into said downstream frames for enabling error correction;

processing and shaping data into said downstream frames for enabling support of delay requirements and channel configurations; and modulating the data into said downstream frames and transmitting said downstream frames over said downstream channel to said subscriber station.

16. A method as claimed in claim 15, wherein step c) comprises:

demodulating said downstream frames received over said downstream channel from said base station; and processing data obtained after demodulation by filtering, decoding and de-randomizing for reconstructing the user data carried by said downstream frames.

17. A method of establishing communication across a broadband wireless access communication network between a base station and a subscriber station, said method comprising:

at said base station, (a) broadcasting over a downstream channel physical layer downstream frames to the subscriber station and (b) receiving from the subscriber station a respective burst of physical layer upstream frames on an upstream channel;

at the subscriber station, (c) extracting the downstream frames addressed to the subscriber station in said downstream channel and (d) transmitting to said base station the respective burst of upstream frames in assigned time-slots allocated to said subscriber station in the upstream channel; and (e) transmitting the upstream channel and the downstream channel between said base station and said subscriber station using a specified duplexing technique, wherein the downstream channel uses a time division multiplexing (TDM) transmission protocol, and the upstream channel uses a time division multiple access (TDMA) protocol, wherein the downstream frames have a fixed length including a configurable-length payload field, and wherein step (d) comprises:

randomizing and thereafter encoding a MAC message of variable length into a codeword, wherein the length of the codeword and the error correction capability of the code are programmable by a burst configuration message received from the base station;

adding a configurable length preamble and a configurable length guard space at the end of each burst processing and shaping data in said burst to obtain said upstream frames; and modulating the data into said upstream frames and transmitting said upstream frames over said upstream channel to said base station in said respective burst.

18. A method as claimed in claim 17, wherein step (b) comprises:

demodulating the upstream frames received in said respective burst over said upstream channel from said subscriber station;

processing data obtained after demodulation by filtering, decoding and de-randomizing for reconstructing the user data carried by said downstream frames.

19. A method as claimed in claim 18, wherein the time allocated for said burst is programmable in steps of 125 usec.

20. A method of establishing communication across a broadband wireless access communication network between a base station and a plurality of subscriber stations, said method comprising:

providing upstream and downstream channels using a duplexing technique;

in a downstream direction at the base station, preparing downstream packets for transmission to said subscriber stations;

mapping said downstream packets into downstream frames; and time division multiplexing said downstream data frames onto a data stream in said downstream channel for transmission to each of said subscriber stations; and in an upstream direction at each subscriber station;

preparing upstream data packets for transmission to said base station; and transmitting said upstream data packets to said base station over said upstream channel in bursts in accordance with a time division multiple access protocol; and wherein said upstream channel is divided into virtual frames for which the frame boundaries are determined by a downstream start indicator.

* * * * *